(12) United States Patent
Toyoda et al.

(10) Patent No.: US 10,315,313 B2
(45) Date of Patent: Jun. 11, 2019

(54) ROBOT DEVICE

(71) Applicant: DENSO CORPORATION, Kariya, Aichi-pref. (JP)

(72) Inventors: Kazutaka Toyoda, Kariya (JP); Tsuyoshi Ueyama, Kariya (JP); Go Mukumoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 262 days.

(21) Appl. No.: 15/291,151

(22) Filed: Oct. 12, 2016

(65) Prior Publication Data
US 2017/0120450 A1    May 4, 2017

(30) Foreign Application Priority Data

Nov. 4, 2015 (JP) ................................. 2015-216628

(51) Int. Cl.
*B25J 13/08* (2006.01)
*B25J 9/00* (2006.01)
*B25J 9/16* (2006.01)

(52) U.S. Cl.
CPC ........... *B25J 13/085* (2013.01); *B25J 9/0081* (2013.01); *B25J 9/1666* (2013.01); *G05B 2219/40476* (2013.01)

(58) Field of Classification Search
CPC ................................ B25J 13/085; B25J 9/008
USPC .......................................................... 73/1.88
See application file for complete search history.

(56) References Cited

U.S. PATENT DOCUMENTS

| | | | | |
|---|---|---|---|---|
| 4,174,760 A | * | 11/1979 | Curchod | .................. G01G 3/08 |
| | | | | 177/211 |
| 4,432,063 A | * | 2/1984 | Resnick | .................. B25J 9/161 |
| | | | | 318/568.13 |
| 7,005,587 B2 | * | 2/2006 | Axakov | ................. B60N 2/002 |
| | | | | 177/164 |

(Continued)

FOREIGN PATENT DOCUMENTS

| | | |
|---|---|---|
| JP | H08-043220 | 2/1996 |
| JP | 2010-269419 A | 12/2010 |
| JP | 2015087292 A * | 5/2015 |

OTHER PUBLICATIONS

Conrad et al. ("Robotic calibration issues: Accuracy, repeatability and calibration." (2000) 17-19).*
ST Robotics (R12 Robot Manual (1-26); Apr. 9, 2015).*

*Primary Examiner* — Justin Seo
*Assistant Examiner* — Jean F Morello
(74) *Attorney, Agent, or Firm* — Harness, Dickey & Pierce, P.L.C.

(57) ABSTRACT

A robot device includes an arm, a force sensor, and an adjustment portion. The force sensor is provided at a front end portion of the arm and has a force detecting portion that detects an externally exerted force. The adjustment portion performs a zero point adjustment by setting a reference point of the force detected by the force sensor based on a detection result by the force sensor. The detection result is obtained when the force detecting portion of the force sensor is in a protected condition. The protected condition is a condition in which no load is applied on the force detecting portion of the force sensor. According to this robot device, a technology for accurately setting the reference point of the force detected by the force sensor can be provided.

10 Claims, 4 Drawing Sheets

(56) References Cited

U.S. PATENT DOCUMENTS

| | | | |
|---|---|---|---|
| 2005/0166413 A1* | 8/2005 | Crampton | B25J 13/088 33/503 |
| 2014/0039681 A1* | 2/2014 | Bowling | A61B 34/32 700/261 |
| 2014/0155912 A1* | 6/2014 | Bodduluri | A61B 17/32053 606/130 |
| 2016/0221193 A1* | 8/2016 | Sato | B25J 9/1694 |

* cited by examiner

ROBOT DEVICE

CROSS REFERENCE TO RELATED APPLICATION

This application is based on and incorporates herein by reference Japanese Patent Application No. 2015-216628 filed on Nov. 4, 2015.

TECHNICAL FIELD

The present disclosure relates to a robot device.

BACKGROUND

Patent Document 1 discloses a multi-joint robot that acts according to a manipulation of an operator. The multi-joint robot described in Patent Document 1 (JP 2010-269419 A) includes a multi-joint arm, a manipulation stick connected to the multi-joint arm, a force sensor connected to the manipulation stick, and a control device controlling a motion of the multi-joint arm.

In the multi-joint robot described in Patent Document 1, the force sensor detects a direction and a size of a force inputted by a user through the manipulation stick. The direction and the size of the force are converted into an amount of a motion of the multi-joint arm that is operated by the control device.

In the multi-joint robot described in Patent Document 1, the multi-joint arm is operated under a prerequisite that a reference point (i.e. zero point) of a force detected by the force sensor is set accurately.

However, in the multi-joint robot described in Patent Document 1, if a zero point adjustment in which the reference point of the force sensor is set is performed while an object is in contact with the manipulation stick or the force sensor, the reference point of the force sensor becomes inaccurate.

Therefore, the conventional technology is required to set the reference point in the zero point adjustment while a force is not exerted on the force sensor.

SUMMARY

It is an objective of the present disclosure to provide a technology for accurately setting a reference point of a force detected by a force sensor in a robot device.

According to an aspect of the present disclosure, a robot device includes an arm, a force sensor, and an adjustment portion.

The force sensor is provided at a front end portion of the arm and has a force detecting portion that detects an externally exerted force. The adjustment portion performs a zero point adjustment by setting a reference point of the force detected by the force sensor based on a detection result by the force sensor. The detection result is obtained when the force detecting portion of the force sensor is in a protected condition. The protected condition is a condition in which no load is applied on the force detecting portion of the force sensor.

According to this robot device, the zero point adjustment can be performed on the basis of the force detected by the force detecting portion of the force sensor while the force detecting portion is in the protected condition. Because no external force is exerted on the force detecting portion of the force sensor while the force detecting portion is in the protected condition, the reference point of the force sensor can be set accurately.

Accordingly, a technology for accurately setting the reference point of the force detected by the force sensor can be provided in the robot device.

BRIEF DESCRIPTION OF THE DRAWINGS

The disclosure, together with additional objectives, features and advantages thereof, will be best understood from the following description, the appended claims and the accompanying drawings, in which:

DETAILED DESCRIPTION

Figure 1:
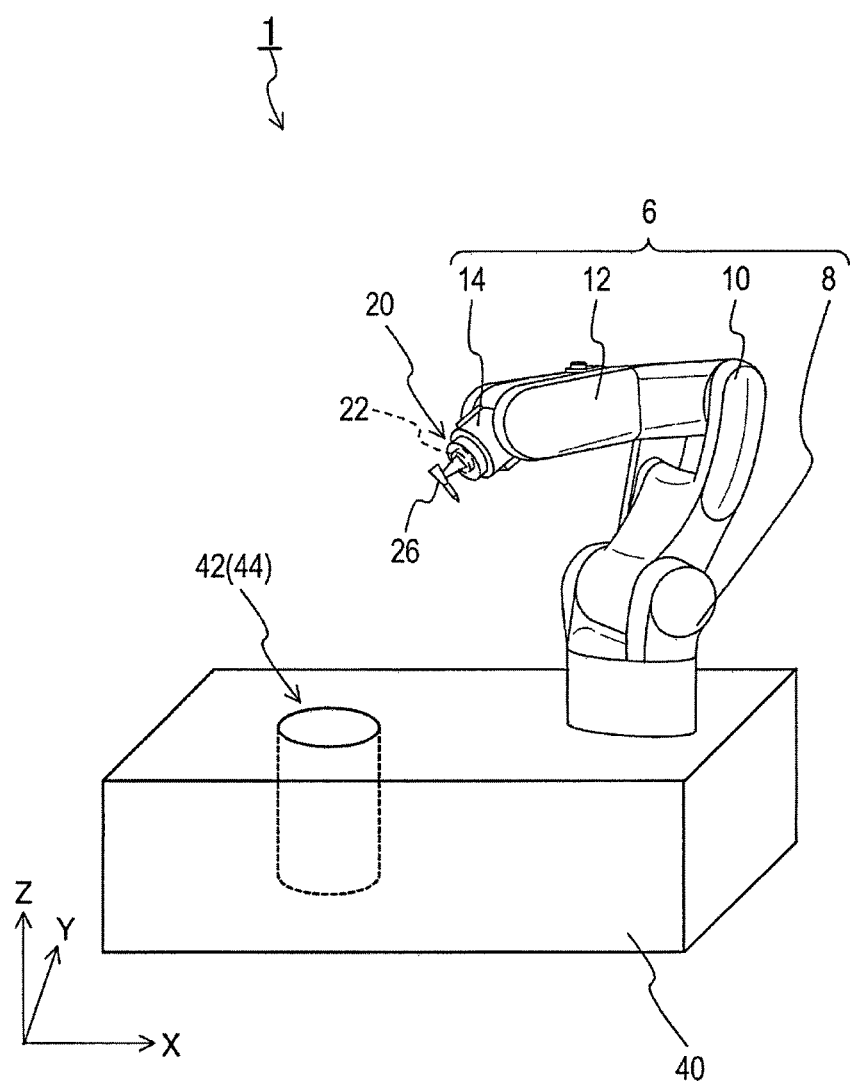
FIG. 1 is a diagram illustrating a robot device according to an embodiment of the present disclosure.

An embodiment of the present disclosure will be described below referring to the drawings.

A robot device 1 shown in FIG. 1 is a vertical multi-joint robot that has an arm 6, a force sensor 20, a tool 26, a robot control portion 30 (refer to FIG. 2), and a base stage 40. The robot device 1 assists an action (hereinafter, referred to as an aim achieving action) of a user.

The aim achieving action here is achieved by the user moving a front end of the arm 6. The aim achieving action may be to transfer an object, to process something, or a medical action. The medical action includes a dental implant. In the dental implant, an implant body is embedded in a bone of a jaw, and a prosthesis is attached to the implant body.

The arm 6 is a mechanism for moving the tool 26, and is a multi-joint arm in which links are joined with each other by joints, for example. The arm 6 of this embodiment is a vertical multi-joint arm having a base portion 8, an upper arm portion 10, a forearm portion 12, and a hand attachment portion 14.

The base portion 8 is fixed to the base stage 40. The upper arm portion 10 is a link extending from the base portion 8. The forearm portion 12 is a link extending from a front end of the upper arm portion 10. The hand attachment portion 14 is a part to which the tool 26 is attached, and the hand attachment portion 14 is positioned at the front end of the forearm portion 12. Therefore, the hand attachment portion 14 corresponds to the front end portion of the arm 6.

Figure 2:
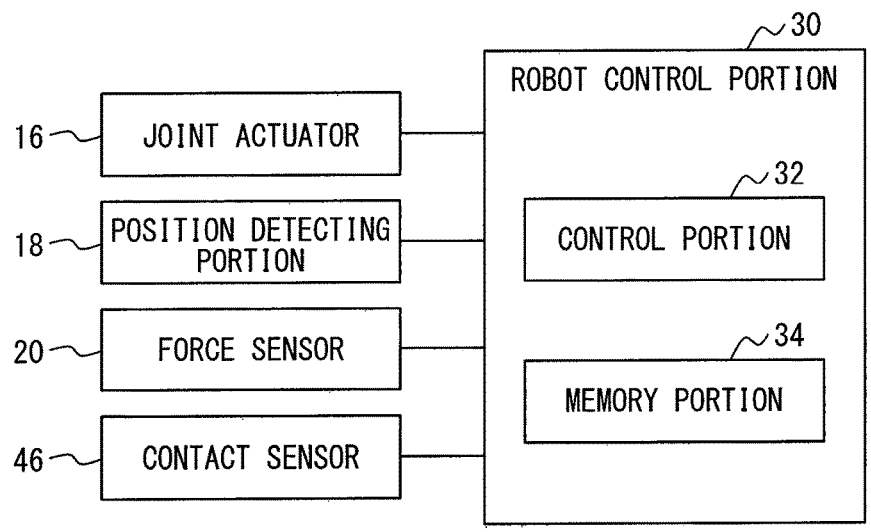
FIG. 2 is a block diagram illustrating a control system of the robot device according to the embodiment.

In the arm 6, the base portion 8 and the upper arm portion 10 are connected with each other through a joint portion. The upper arm portion 10 and the forearm portion 12 are connected with each other through a joint portion. The forearm portion 12 and the hand attachment portion 14 are connected with each other through a joint portion. Each joint portion includes a joint actuator 16 and a position detecting portion 18 as shown in FIG. 2. The joint actuator 16 is a device driving each joint. An electric motor is an example of the joint actuator 16.

The position detecting portion 18 is a known sensor and detects a coordinate of a front end position that represents a position of the front end of the arm 6. Accordingly, the position detecting portion 18 detects a position of the tool 26. A rotary encoder detecting a rotation angle of each joint is an example of the position detecting portion 18.

The force sensor 20 is a known sensor that has a force detecting portion 22 detecting sizes and directions of external forces that are exerted in several directions. The force detecting portion 22 here has a known mechanism that has a strain gauge and detects the forces (external forces) exerted from an outside, for example. The external forces are forces exerted on the force detecting portion 22. The external forces includes a force exerted on the force detecting portion 22 by a motion of the tool 26 caused by the user of the robot device 1, and a force exerted on the force detecting portion 22 by a contact with an object, for example. The external forces here mean forces exerted on the force detecting portion 22 by other things than the force detecting portion 22.

The force sensor 20 is provided in the front end portion of the arm 6. The force sensor 20 may be provided in the hand attachment portion 14. The tool 26 is a tool performing the aim achieving action. For example, when the aim achieving action is to transfer an object, a hand may be used as the tool 26. When the aim achieving action is to process something, a cutting tool or a polishing tool may be used as the tool 26.

When the aim achieving action is a medical action, a tool performing the medical action for a patient may be used as the tool 26. The tool performing the medical action includes a drill unit that is used for a dental remedy. The drill unit has a drill bit for dental remedy and a drill driving mechanism driving the drill bit. The drill bit here includes a dental handpiece. The dental handpiece includes a straight-geared-angle handpiece and a contra-angle handpiece.

The tool 26 is attached to the hand attachment portion 14 through the force sensor 20. The tool 26 is attached to the front end portion of the arm 6. The base stage 40 is a stage on which the arm 6 is placed. The base stage 40 includes a protection portion 42.

Figure 3:
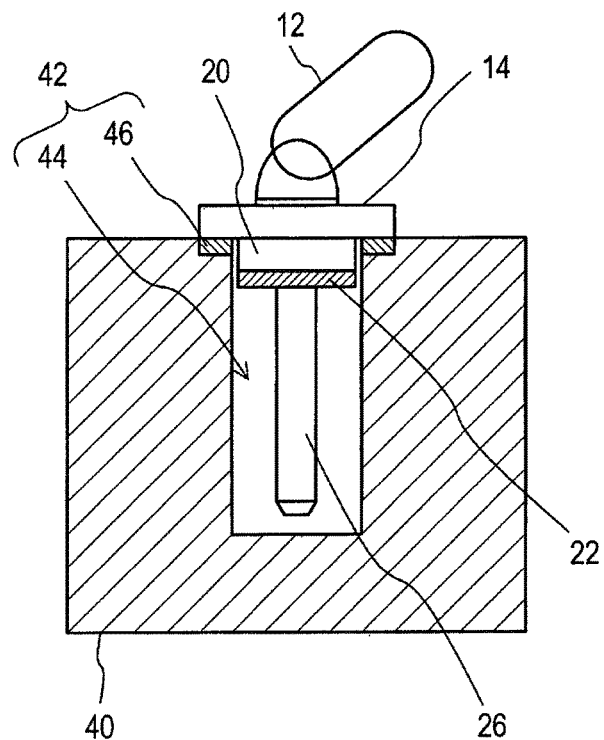
FIG. 3 is a diagram illustrating a protection portion according to the embodiment.

The protection portion 42 has a recess portion 44 and a contact sensor 46, as shown in FIG. 3. The recess portion 44 is a recess that accommodates the force detecting portion 22 of the force sensor 20 and the tool 26 attached to the hand attachment portion 14 of the arm 6. A bottom surface and a side surface of the recess portion 44 are provided not to contact to the force detecting portion 22 and the tool 26 accommodated in the recess portion 44.

Therefore, when the force detecting portion 22 of the force sensor 20 and the tool 26 attached to the hand attachment portion 14 of the arm 6 are accommodated in the recess portion 44, the force detecting portion 22 of the force sensor 20 is screened from an outside, and the force detecting portion 22 of the force sensor 20 is spaced from the bottom surface and the side surface of the recess portion 44. The force detecting portion 22 of the force sensor 20 may be capsulated and surrounded by an air buffer when the force detecting portion 22 of the force sensor 20 and the tool 26 attached to the hand attachment portion 14 of the arm 6 are accommodated in the recess portion 44.

The recess portion 44 may be formed by boring the base stage 40. The contact sensor 46 is a known sensor detecting a contact of an object. The contact sensor 46 of this embodiment is provided on a rim of the recess portion 44 of the protection portion 42 so as to detect a contact with the front end portion of the arm 6 as an object.

The robot control portion 30 includes a control portion 32 and a memory portion 34, and the robot control portion 30 drives the joint actuator 16 of the arm 6. The control portion 32 is a control device having a known microcomputer that has at least a ROM, a RAM, and a CPU. The memory portion 34 is a known device that stores information and data.

A processing program for causing the robot control portion 30 to perform an initiation process, in which a standard value (zero point) of the force detected by the force sensor 20, is stored in the memory portion 34. A position of the protection portion 42 in the base stage 40, i.e. a coordinate in a real space, is stored in the memory portion 34.

Next, the initiation process performed by the robot control portion 30 will be described below.

Figure 4:
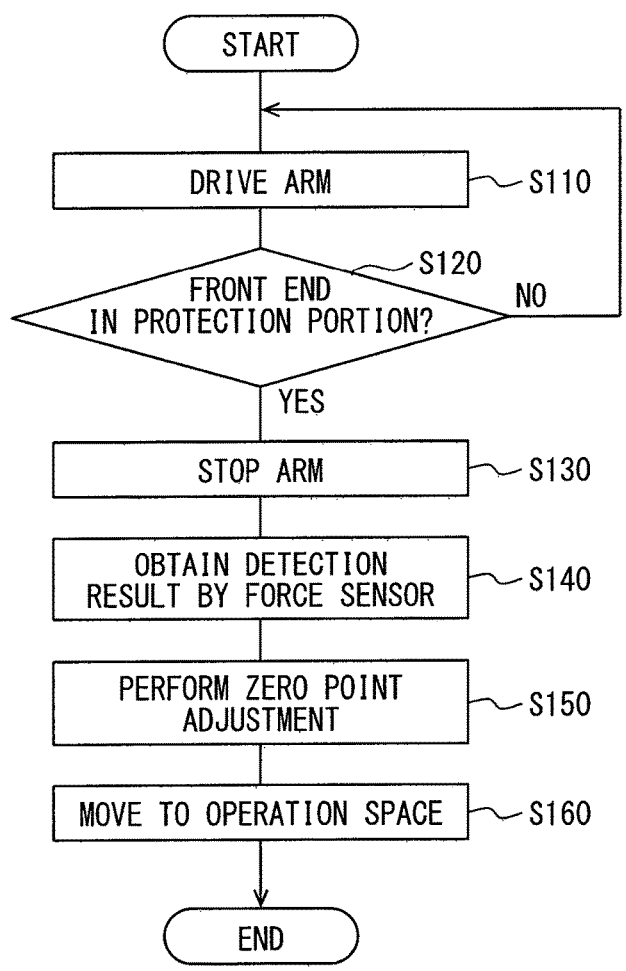
FIG. 4 is a flowchart illustrating a procedure of a initialization process that is performed by the robot control portion according to the embodiment.
Figure 5:
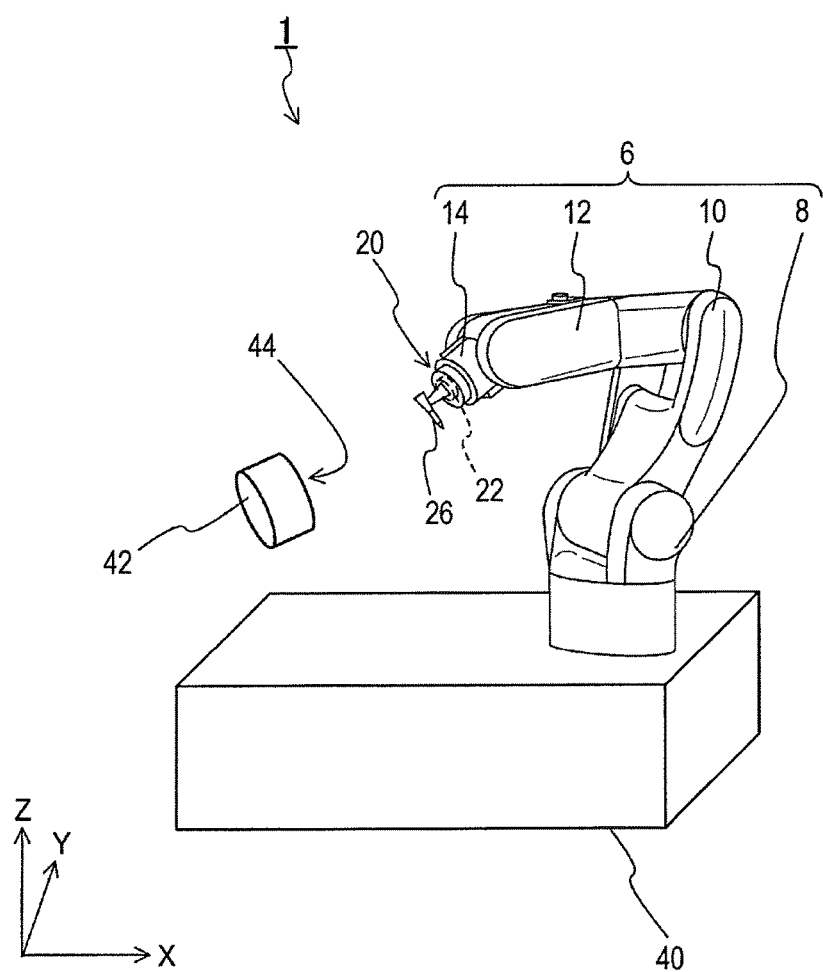
FIG. 5 is a diagram illustrating an example of a modification of the protection portion according to the embodiment.

The initiation process is started when an electricity starts to be supplied to the robot device 1. When the initiation process is started, the robot control portion 30 drives the arm 6 so that the front end of the arm 6 moves to the protection portion 42 of the base stage 40 (S110), as shown in FIG. 4.

Subsequently, the robot control portion 30 determines whether the front end of the arm 6 is positioned in the protection portion 42 of the base stage 40 (S120). As a result of S120, when the front end of the arm 6 is not located in the protection portion 42 (S120: NO), the robot control portion 30 returns the initiation process to S110. The robot control portion 30 drives the arm 6 until the front end of the arm 6 is located in the protection portion 42.

On the other hand, as a result of S120, when the front end of the arm 6 is located in the protection portion 42 (S120: YES), the robot control portion 30 determines that the force detecting portion 22 is in a protected condition, and the robot control portion 30 moves the initiation process to S130.

The protected condition is a condition in which no load is applied on the force detecting portion 22 of the force sensor 20. In this embodiment, the protected condition is a condition, in which the force detecting portion 22 is screened from the outside and spaced from the outside. The protected condition may be a condition, in which the force detecting portion 22 is screened from the outside by the protection portion 42 and spaced from the bottom surface and the side surface of the protection portion 42. The protected condition may be a condition, in which the force detecting portion 22 is encapsulated in the protection portion 42 and surrounded by an air buffer.

Specifically, at S120 of this embodiment, when two conditions described below are satisfied, the robot control portion 30 determines that the force detecting portion 22 is in the protected condition. One of the two conditions is that the front position of the arm 6 detected by the position detecting portion 18, i.e. the coordinates of the force detecting portion 22 of the force sensor 20 and the tool 26, is in the recess portion 44 of the protection portion 42.

The other of the two conditions is that the result of the detection by the contact sensor 46 indicates that the front end of the arm 6 is in contact with the rim of the recess portion 44 of the protection portion 42. At S130, the robot control portion 30 stops driving the arm 6.

Next, the robot control portion 30 obtains a result of the detection by the force sensor 20 (S140). Specifically, at S140, the robot control portion 30 obtains all the results of the detection by the force sensor 20 during a predetermined period.

Further in the initiation process, the robot control portion 30 performs a zero point adjustment (S150). The zero point adjustment is a process to set a representative value of the result of the detection by the force sensor 20 as the reference point of the force detected by the force sensor 20. The representative value is a value representing a distribution of the result of the detection by the force sensor 20. The representative value may be an average value of the distribution of the result, a median of the distribution, or a mode of the distribution.

Next in the initiation process, the robot control portion 30 moves the arm 6 to an operation place in which the aim achieving action is performed (S160). Subsequently, the robot control portion 30 ends the initiation process and assists the aim achieving action.

In the initiation process, when no load is applied on the force detecting portion 22 of the force sensor 20 (i.e. in the protected condition), the robot control portion 30 obtains the result of the detection by the force sensor 20 and performs the zero point adjustment in which the zero point of the force detected by the force sensor 20 is set.

Effects of the Embodiment

According to the robot device 1, the zero point adjustment can be performed on the basis of the force detected by the force detecting portion 22 of the force sensor 20 in the protected condition.

In the protected condition, because an external force is not exerted on the force detecting portion 22 of the force sensor 20, the reference point of the force detected by the force sensor 20 can be set accurately. Accordingly, a technology, which is capable of setting the reference point of the force detected by the force sensor 20 accurately in the robot device 1, can be provided.

In the robot device 1, the recess portion 44 is provided as a recess accommodating both the force detecting portion 22 of the force sensor 20 and the tool 26 attached to the hand attachment portion 14 of the arm 6.

When the tool 26 and the force detecting portion 22 of the force sensor 20 are accommodated in the recess portion 44, both the tool 26 and the force detecting portion 22 of the force sensor 20 are screened from an outside and spaced from the bottom surface and the side surface of the recess portion 44 (i.e. protected condition). When the tool 26 and the force detecting portion 22 of the force sensor 20 are accommodated in the recess portion 44, both the tool 26 and the force detecting portion 22 of the force sensor 20 may be encapsulated and surrounded by an air buffer.

Therefore, according to the robot device 1, the zero point adjustment of the force sensor 20 can be performed while the tool 26 and the force sensor 20 are attached to the arm 6.

In the initiation process, one of the two conditions to determine that the force detecting portion 22 is in the protected condition is that the front end position of the arm 6 is in the recess portion 44.

Therefore, the robot device 1 is capable of detecting accurately that the force detecting portion 22 is in the protected condition.

Further in the initiation process, the other of the two conditions to determine that the force detecting portion 22 is in the protected condition is that the result of the detection by the contact sensor 46 indicates that the front end of the arm 6 is in contact with the rim of the recess portion 44.

Therefore, the robot device 1 is capable of detecting more accurately that the force detecting portion 22 is in the protected condition.

In the zero point adjustment of the initiation process, the representative value of the result of the detection by the force sensor 20 obtained during the predetermined period in the protected condition is set as the reference point of the force detected by the force sensor 20.

Therefore, the representative value of the result of the detection by the force sensor 20 obtained in the protected condition is set to the reference point of the force detected by the force sensor 20, and the setting accuracy of the reference point can be high.

Although the present disclosure has been fully described in connection with the preferred embodiments thereof with reference to the accompanying drawings, it is to be noted that various changes and modifications will become apparent to those skilled in the art.

In the above-described embodiment, the sensor measuring the external force is used as the force sensor 20. However, the force sensor 20 is not limited to a sensor that measures the force directly. For example, the force sensor 20 may be an acceleration sensor measuring an acceleration, or another sensor capable of measuring something that can be converted into force.

In the above-described embodiment, the position of the contact sensor 46 is on the rim of the recess portion 44. However, the position of the contact sensor 46 is not limited to this. The contact sensor 46 may be provided in a part of the front end portion of the arm 6 contacting the rim of the recess portion 44.

At S120 of the initiation process, when the coordinate of the front end position of the arm 6 detected by the position detecting portion 18 is in the recess portion 44 of the protection portion 42, and when the contact sensor 46 detects the contact of the front end of the arm 6, the robot control portion 30 determines that the force detecting portion 22 is in the protected condition.

However, the condition in which the robot control portion 30 determines that the force detecting portion 22 is in protected condition at S120 is not limited to this. For example, when the front end of the arm 6 is not in contact with a particular surface of the base stage 40 or a particular surface located in a space where the robot device 1 is provided, and when the front end of the arm 6 is spaced from the particular surface, the robot control portion 30 may determine that the force detecting portion 22 is in the protected condition.

When the robot control portion 30 obtains an external signal indicating that no load is applied on the force detecting portion 22 of the force sensor 20, the robot control portion 30 may determine that the force detecting portion 22 is in the protected condition. The outside here may be a switch operated by the user of the robot device 1 or another computer connected with the robot control portion 30.

If the protection portion 42 is a cover formed separately from the base stage 40, the robot control portion 30 may determine that the force detecting portion 22 is in the protected condition when the robot control portion 30 obtains an external signal (coverage signal) from the outside indicating that the protection portion 42 is attached to the front end portion of the arm 6. The outside here may be a switch operated by the user of the robot device 1 or another computer connected with the robot control portion 30.

The robot control portion 30 may judge any condition as the protected condition as long as no load is applied on the force detecting portion 22 of the force sensor 20.

In the above-described embodiment, the robot device 1 is a vertical multi-joint robot having a vertical multi-joint arm. However, the robot device 1 is not limited to this. For example, a horizontal multi-joint robot may be used as the robot device 1.

A part or all of the functions performed by the robot control portion 30 in the above-described embodiment may be provided by one or multiple ICs as hardware.

In the above-described embodiment, the programs are stored in the memory portion 34. However, the memory medium in which the programs are stored is not limited to this, and the programs may be stored in a non-transitory tangible storage medium such as a semiconductor memory.

The control portion 32 executes programs stored in a non-transitory tangible storage medium. The functions corresponding to the programs are obtained by executing the programs.

Additional advantages and modifications will readily occur to those skilled in the art. The disclosure in its broader terms is therefore not limited to the specific details, representative apparatus, and illustrative examples shown and described.

The functions that can be obtained by performing S110-S150 correspond to an adjustment portion.

What is claimed is:

1. A robot device comprising:
   an arm;
   a force sensor provided at a front end portion of the arm, the force sensor having a force detecting portion that detects an externally exerted force;
   a protection portion having a recess portion defined by a cylindrical lateral wall and a bottom wall, the recess portion being configured to accommodate the force detecting portion;
   a contact sensor provided around an inlet of the recess to surround the inlet, the contact sensor being configured to detect a contact of an object; and
   an adjustment portion configured to
      determine whether the force sensor is in a protected condition in which no load is applied on the force detecting portion of the force sensor, and
      perform a zero point adjustment by setting a reference point of the force detected by the force sensor based on a detection result by the force sensor, the detection result obtained when the force detecting portion of the force sensor is in the protected condition, wherein
   a part of the front end portion of the arm is configured to contact an entire part of the contact sensor, and the adjustment portion determines that the force detecting portion is in the protected condition when the contact sensor detects a contact of the arm.

2. The robot device according to claim 1, wherein the adjustment portion determines that the force detecting portion is in the protected condition when the force detecting portion is encapsulated and surrounded by an air buffer.

3. The robot device according to claim 2, wherein the adjustment portion determines that the force detecting portion is in the protected condition when the front end position detected by the position detecting portion is in the recess portion of the protection portion.

4. The robot device according to claim 3, further comprising
   a tool attached to the front end portion of the arm, wherein
   the recess portion of the protection portion is a recess accommodating the tool and the force detecting portion of the force sensor.

5. The robot device according to claim 3, wherein the arm is placed on a base stage.

6. The robot device according to claim 5, wherein the protection portion is provided in the base stage.

7. The robot device according to claim 5, wherein the adjustment portion determines that the force detecting portion is in the protected condition when the adjustment portion obtains an external signal indicating that no load is applied on the force detecting portion of the force sensor.

8. The robot device according to claim 7, wherein
   the protection portion is a cover formed separately from the base stage, and
   the adjustment portion obtains a coverage signal indicating that the protection portion is attached to the front end portion of the arm, the adjustment portion using the coverage signal as the external signal indicating that no load is applied on the force detecting portion of the force sensor.

9. The robot device according to claim 1, wherein the adjustment portion performs, as the zero point adjustment, a setting of a representative value of the detection result by the force sensor as the reference point.

10. The robot device according to claim 4, wherein a depth of the recess portion is larger than a length of the tool.

* * * * *